United States Patent
Li et al.

(10) Patent No.: US 11,038,259 B2
(45) Date of Patent: Jun. 15, 2021

(54) MOBILE TERMINAL, ANTENNA CONTROL METHOD AND STORAGE MEDIUM

(71) Applicant: BEIJING XIAOMI MOBILE SOFTWARE CO., LTD., Beijing (CN)

(72) Inventors: Peng Li, Beijing (CN); Gaocai Han, Beijing (CN); Fang Guo, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/699,569

(22) Filed: Nov. 30, 2019

(65) Prior Publication Data

US 2021/0021017 A1   Jan. 21, 2021

(30) Foreign Application Priority Data

Jul. 17, 2019   (CN) .......................... 201910646241.6

(51) Int. Cl.
*H01Q 1/24*   (2006.01)
*H04M 1/02*   (2006.01)

(52) U.S. Cl.
CPC .......... *H01Q 1/243* (2013.01); *H04M 1/0268* (2013.01)

(58) Field of Classification Search
CPC ........ H01Q 1/243; H01Q 1/38; H01Q 1/2266; H04M 1/0268; H04M 1/0214; H04M 1/0235; H04M 1/0245; H04M 1/236; H04M 1/026; H04M 1/724; H04M 2201/34; H04M 2250/12; G06F 1/1616; G06F 1/1624;
(Continued)

(56) References Cited

U.S. PATENT DOCUMENTS

| | | | | |
|---|---|---|---|---|
| 9,159,260 | B2* | 10/2015 | Oh ...................... | H04M 1/0245 |
| 2003/0045246 | A1* | 3/2003 | Lee ........................ | H01Q 1/246 |
| | | | | 455/575.1 |
| 2010/0167791 | A1 | 7/2010 | Lim | |

(Continued)

FOREIGN PATENT DOCUMENTS

| CN | 103873670 A | 6/2014 |
|---|---|---|
| CN | 104539764 A | 4/2015 |

(Continued)

OTHER PUBLICATIONS

International Search Report for PCT application PCT/CN2019/111314 dated Apr. 9, 2020.

(Continued)

*Primary Examiner* — Eugene Yun
(74) *Attorney, Agent, or Firm* — Syncoda LLC; Feng Ma

(57) ABSTRACT

A mobile terminal includes a body, and a flexible display screen disposed at the body. The flexible display screen is switchable between an expanded configuration and a retracted configuration. In the expanded configuration, the flexible display screen is expanded to a first area, and in the retracted configuration, the flexible display screen is retracted to a second area. The first area is larger than the second area. A millimeter-wave antenna module is disposed at an edge of the flexible display screen. The method includes: controlling the millimeter-wave antenna module to be in a non-working state when the flexible display screen is in the retracted configuration; and controlling the millimeter-wave antenna module to be in a working state when the flexible display screen is in the expanded configuration.

20 Claims, 18 Drawing Sheets

(58) Field of Classification Search
CPC .... G06F 1/1641; G06F 1/1671; G06F 1/1677; G06F 1/1698; G06F 1/1652
USPC ........................................................ 455/566
See application file for complete search history.

(56) References Cited

U.S. PATENT DOCUMENTS

| | | | | |
|---|---|---|---|---|
| 2013/0058063 | A1* | 3/2013 | O'Brien | G06F 1/1652 361/807 |
| 2014/0240178 | A1 | 8/2014 | Chun et al. | |
| 2016/0179236 | A1 | 6/2016 | Shin et al. | |
| 2017/0294705 | A1* | 10/2017 | Khripkov | H01Q 21/24 |
| 2018/0026341 | A1 | 1/2018 | Mow et al. | |
| 2018/0358684 | A1 | 12/2018 | Chun et al. | |
| 2019/0103656 | A1 | 4/2019 | Shi et al. | |

FOREIGN PATENT DOCUMENTS

| | | |
|---|---|---|
| CN | 106165195 A | 11/2016 |
| CN | 107404552 A | 11/2017 |
| CN | 107949194 A | 4/2018 |
| CN | 108347759 A | 7/2018 |
| CN | 108712536 A | 10/2018 |
| CN | 109167151 A | 1/2019 |
| CN | 109167153 A | 1/2019 |
| CN | 109167154 A | 1/2019 |
| CN | 208637578 U | 3/2019 |
| CN | 208637579 U | 3/2019 |
| CN | 109725680 A | 5/2019 |
| KR | 20060135217 A | 12/2006 |
| KR | 20070043313 A | 4/2007 |
| KR | 100818170 B1 | 4/2008 |
| KR | 20090127540 A | 12/2009 |
| KR | 20110049546 A | 5/2011 |
| KR | 20110082359 A | 7/2011 |
| KR | 20120001943 A | 1/2012 |
| KR | 20120096723 A | 8/2012 |
| KR | 20130085528 A | 7/2013 |
| KR | 20130127122 A | 11/2013 |
| KR | 20140105886 A | 9/2014 |
| KR | 20170050270 A | 5/2017 |
| KR | 20170062327 A | 6/2017 |
| KR | 20170083404 A | 7/2017 |
| KR | 20170089664 A | 8/2017 |
| RU | 2611023 C2 | 2/2017 |
| RU | 2683290 C2 | 3/2019 |
| WO | 2016061017 A1 | 4/2016 |
| WO | 2017070435 A1 | 4/2017 |

OTHER PUBLICATIONS

1st Office Action in KR 10-2019-7032848 dated May 28, 2020.
Russian NOA & Search Report in 2019139498 dated May 26, 2020.
Extended European Search Report in Application No. 19217920.8, dated Jul. 17, 2020.
Notice of Allowance for KR Application No. 10-2019-7032848 dated Jan. 28, 2021.
CN First Office Action in Application No. 201910646241.6, dated Mar. 23, 2021.
International Search Report in Application No. PCT/CN2019/111314, dated Apr. 9, 2020.

* cited by examiner

MOBILE TERMINAL, ANTENNA CONTROL METHOD AND STORAGE MEDIUM

CROSS-REFERENCE TO RELATED APPLICATION

This disclosure claims priority to Chinese Patent Application No. 201910646241.6 filed on Jul. 17, 2019, the disclosure of which is hereby incorporated by reference in its entirety.

BACKGROUND

A flexible display screen with properties such as arbitrary bending and good flexibility has been applied to many mobile terminals. For the mobile terminal employing the flexible display screen, the flexible display screen can be expanded to enlarge an area of the screen when the mobile terminal is used, and the flexible display screen can be retracted to reduce the area of the screen when the mobile terminal is carried. Therefore, the size of the screen can be selected as desired, to make the mobile terminal more convenient.

SUMMARY

This disclosure relates to a field of mobile terminals, and in particular, to a mobile terminal, an antenna control method, and a storage medium.

Various embodiments of the disclosure provide a mobile terminal, an antenna control method and a storage medium, which can solve problems such as there is no enough space in a flexible display screen to receive millimeter-wave antenna modules.

According to one aspect of the present disclosure, a mobile terminal is provided. The mobile terminal includes: a body and a flexible display screen disposed on the body; wherein the flexible display screen is configured to be switchable between an expanded configuration in which the flexible display screen is expanded to a first area and a retracted configuration in which the flexible display screen is retracted to a second area, and the first area is larger than the second area;

a millimeter-wave antenna module is disposed at an edge of the flexible display screen.

In some embodiments, the flexible display screen is rectangular, and a first rectangular edge of the flexible display screen is secured to the body; and the millimeter-wave antenna module is disposed on at least one of a second rectangular edge, a third rectangular edge and a fourth rectangular edge of the flexible display screen.

The rectangular shape may be a rectangle or a rounded rectangle.

In some embodiments, the flexible display screen is rectangular, a central portion of a second rectangular edge of the flexible display screen is secured to the body, and a central portion of a fourth rectangular edge of the flexible display screen is secured to the body; the second rectangular edge and the fourth rectangular edge are two parallel rectangular edges; and the millimeter-wave antenna module is disposed on at least one of the first rectangular edge, the second rectangular edge, the third rectangular edge and the fourth rectangular edge of the flexible display screen.

The rectangular shape may be a rectangle or a rounded rectangle.

In some embodiments, the millimeter-wave antenna module includes at least two sets of millimeter-wave antenna modules arranged discretely.

In some embodiments, each set of millimeter-wave antenna modules include an antenna array composed of at least two millimeter-wave antennas.

In some embodiments, a control module is further disposed within the body; and the control module is electrically connected with the millimeter-wave antenna module.

In some embodiments, the control module is configured to control the millimeter-wave antenna module to be in a non-working state when the flexible display screen is in the retracted configuration, and control the millimeter-wave antenna module to be in a working state when the flexible display screen is in the expanded configuration.

In some embodiments, the control module is configured to control the flexible display screen to be in the retracted configuration or in the expanded configuration according to a type of a foreground application.

In some embodiments, the body is provided with a configuration detection component; the control module is connected with the configuration detection component; and the control module is configured to determine whether the flexible display screen is in the retracted configuration or in the expanded configuration according to a signal output by the configuration detection component.

In some embodiments, the configuration detection component includes a Hall sensor disposed within the body, and a magnet disposed at a side of the flexible display screen;

the Hall sensor is configured to output a first signal to the control module when the flexible display screen is in the retracted configuration, and output a second signal to the control module when the flexible display screen is in the expanded configuration.

In some embodiments, an antenna switch is further disposed within the body;

the millimeter-wave antenna module is in the non-working state when the antenna switch is in a first switch state; and the millimeter-wave antenna module is in a working state when the antenna switch is in a second switch state.

In some embodiments, a primary antenna is further disposed within the body;

the primary antenna includes: a main antenna, or the main antenna and a diversity antenna.

In some embodiments, at least one of a Global Positioning System (GPS) receiving antenna and a wireless fidelity (WIFI) antenna is further disposed within the body.

In some embodiments, a control module is further disposed within the body; and the control module is electrically connected with the primary antenna and the millimeter-wave antenna module, respectively.

In some embodiments, the control module is configured to control the primary antenna to be in the working state and control the millimeter-wave antenna module to be in the non-working state when the flexible display screen is in the retracted configuration; and control the primary antenna to be in the non-working configuration and control the millimeter-wave antenna module to be in the working state when the flexible display screen is in the expanded state.

In some embodiments, the control module is configured to control the flexible display screen to be in the retracted configuration or in the expanded configuration according to a type of a foreground application.

In some embodiments, a state detection component is disposed on the body;

the control module is connected with the state detection component;

the control module is configured to detect whether the flexible display screen is in the retracted configuration or in the expanded configuration according to the state detection component.

According to another aspect of the present disclosure, an antenna control method applied to the mobile terminal as described above is provided. The method includes:

controlling the millimeter-wave antenna module to be in a non-working state when the flexible display screen is in the retracted configuration; and controlling the millimeter-wave antenna module to be in a working state when the flexible display screen is in the expanded configuration.

In some embodiments, the method further includes:

controlling the flexible display screen to be in the retracted configuration or in the expanded configuration according to a type of a foreground application.

In some embodiments, a state detection component is disposed on the body; and the method further includes:

detecting whether the flexible display screen is in the retracted configuration or in the expanded configuration according to the state detection component.

According to another aspect of the present disclosure, an antenna control method applied to a mobile terminal as described above is provided. The method includes:

controlling the primary antenna to be in a working state and controlling the millimeter-wave antenna module to be in a non-working state when the flexible display screen is in the retracted configuration; and controlling the primary antenna to be in a non-working state and controlling the millimeter-wave antenna module to be in a working state when the flexible display screen is in the expanded configuration.

In some embodiments, the method further includes:

controlling the flexible display screen to be in the retracted configuration or in the expanded configuration according to a type of a foreground application.

In some embodiments, a state detection component is disposed on the body;

and the method further includes:

detecting whether the flexible display screen is in the retracted configuration or in the expanded configuration according to the state detection component.

According to another aspect of the present disclosure, an antenna control method applied in a mobile terminal as described above is provided.

In some embodiments, the method includes:

enabling the millimeter-wave antenna module to be in a non-working state when the antenna switch is in a first switch state; and enabling the millimeter-wave antenna module to be in a working state when the antenna switch is in a second switch state.

According to another aspect of the present disclosure, a computer-readable storage is provided. A computer program is stored in the computer-readable storage medium, for implementing the antenna control method according to the above aspect when the computer program is executed by a processor.

It is to be understood that the above general descriptions and the following detailed descriptions are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, serve to explain the principles of the present disclosure together with the description.

DETAILED DESCRIPTION

Reference will now be made in detail to the exemplary embodiments, examples of which are illustrated in the accompanying drawings. When the following description are related to the accompanying drawings, the same numbers in different drawings represent the same or similar elements unless otherwise indicated. The implementations described in the following exemplary embodiments do not represent all implementations consistent with the present disclosure. Rather, they are only examples of devices and methods consistent with certain aspects of the present disclosure, as detailed in the appended claims.

Figure 1:
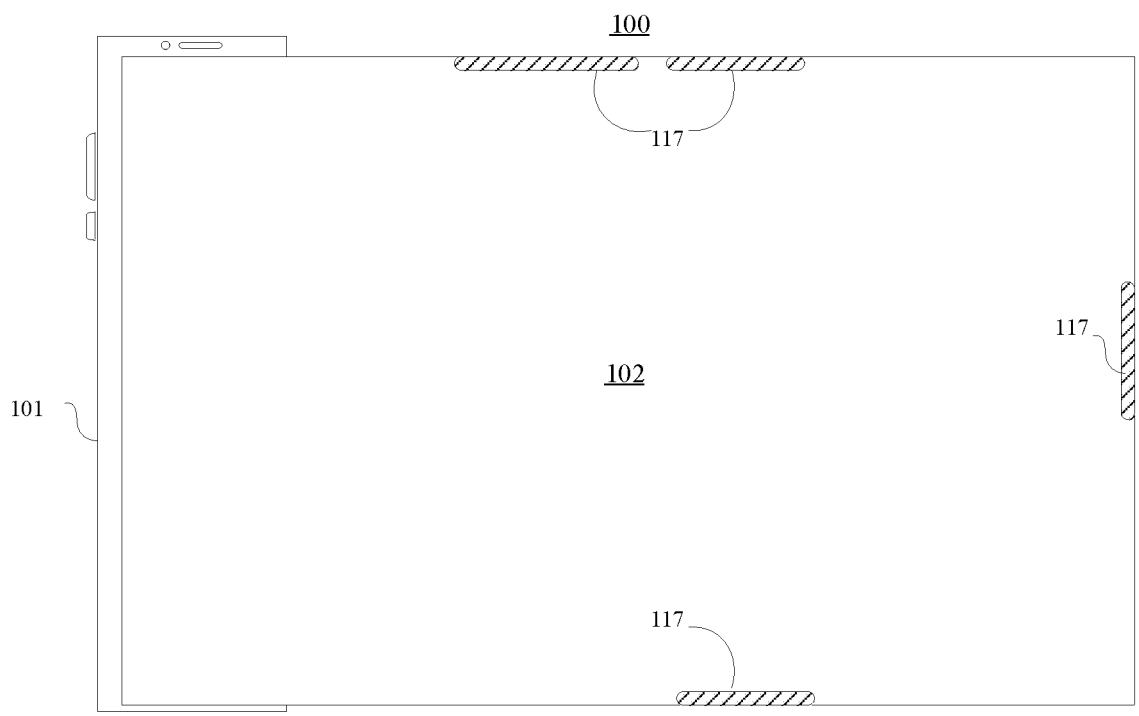
FIG. 1 is a schematic structural view of a mobile terminal according to an exemplary embodiment of the present disclosure.

FIG. 1 shows a schematic structural view of a mobile terminal 100 according to an exemplary embodiment of the present disclosure. The mobile terminal 100 includes: a body 101 and a flexible display screen 102 provided on the body 101;

wherein the flexible display screen 102 is configured to be switchable between an expanded configuration in which the flexible display screen 102 is expanded to a first area and a retracted configuration in which the flexible display screen 102 is retracted to a second area, the first area is larger than the second area; and a millimeter-wave antenna module 117 is provided at an edge of the flexible display screen 102.

Millimeter-wave communications can have properties such as short wavelength, narrow radiation area, etc. A number of millimeter-wave antennas can be placed in one millimeter-wave module to ensure that the millimeter-wave antennas have good receiving and transmitting distances. A plurality of millimeter-wave modules can be configured to meet the requirements of omnidirectional signal radiation.

As above described, in the mobile terminal provided by this embodiment, the millimeter-wave antenna module is placed by using the expandable area of the flexible screen, which can provide a good working environment for the millimeter-wave antenna module, and also not occupy the space of the body, and thus facilitate applying the millimeter-wave antenna module to the mobile terminal.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

Figure 2:
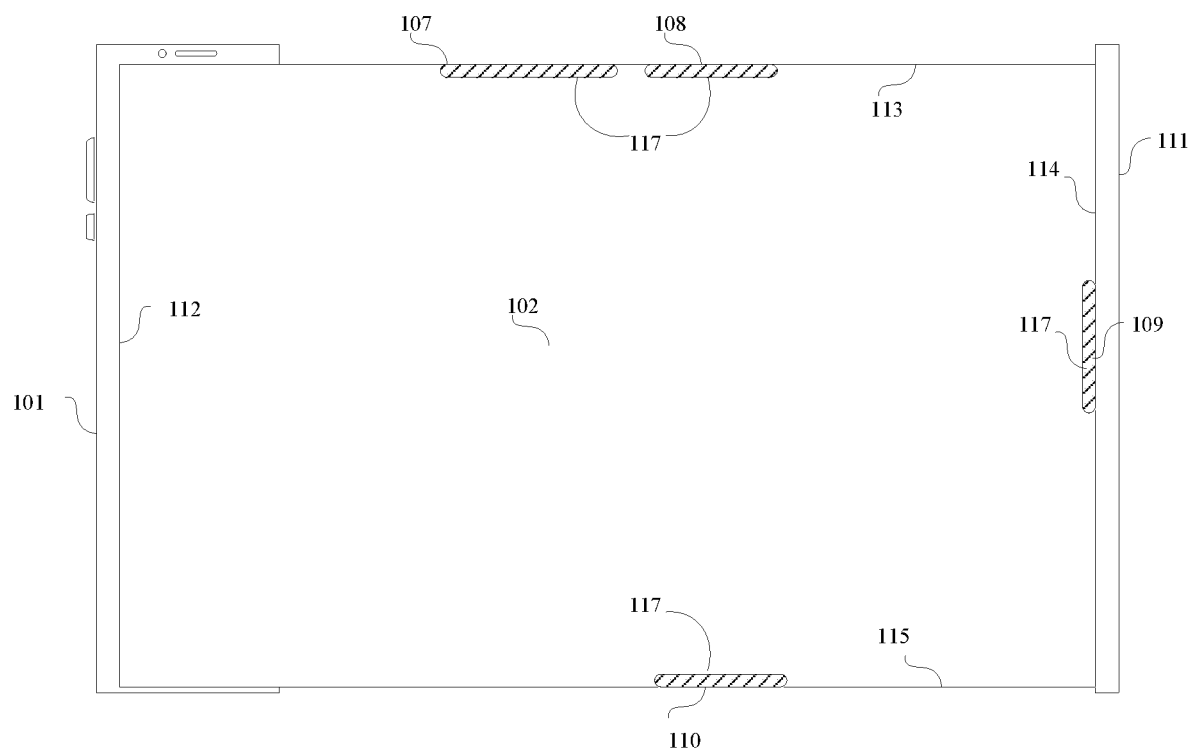
FIG. 2 is a schematic structural view of a mobile terminal when a flexible display screen is in an expanded configuration according to another exemplary embodiment of the present disclosure.

FIG. 2 is a structural view of a mobile terminal according to another exemplary embodiment of the present disclosure. The mobile terminal includes: a body 101, a flexible display screen 102 and a flexible display screen receiving component 111.

Illustratively, the flexible display screen 102 is rectangular. The flexible display screen 102 includes four sequentially connected rectangular sides, that is, a first rectangular edge 112, a second rectangular edge 113, a third rectangular edge 114 and a fourth rectangular edge 115.

Illustratively, the rectangular shape may be a rectangle or a rounded rectangle.

The first rectangular edge 112 of the flexible display screen 102 is secured to the body 101.

A millimeter-wave antenna module 117 is provided on at least one of the second rectangular edge 113, the third rectangular edge 114, and the fourth rectangular edge 115 of the flexible display screen 102.

Illustratively, the millimeter-wave antenna module 117 includes at least two sets of millimeter-wave antenna modules arranged discretely.

Illustratively, each set of millimeter-wave antenna modules 117 includes an antenna array composed of at least two millimeter-wave antennas.

In FIG. 2, four millimeter-wave antenna modules 117 are provided, including a first millimeter-wave antenna module 107, a second millimeter-wave antenna module 108, a third millimeter-wave antenna module 109, and a fourth millimeter-wave antenna module 110.

Figure 3:
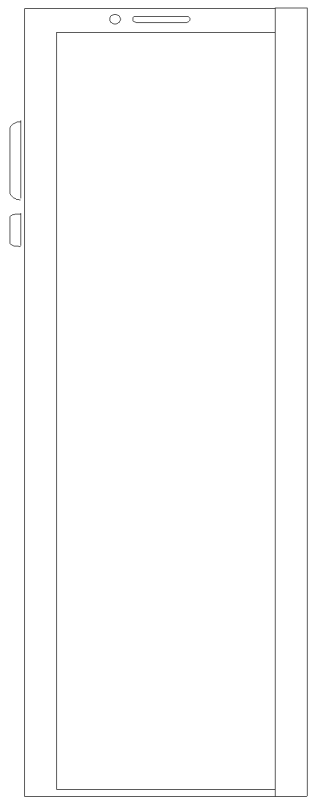
FIG. 3 is a schematic structural view of a mobile terminal when the flexible display screen is in a retracted configuration according to another exemplary embodiment of the present disclosure.

In one example, the third rectangular edge 114 of the flexible display screen 102 is secured to the flexible display screen receiving component 111. The flexible display screen 102 may be expanded or retracted in the direction of the third rectangular edge 114. FIG. 2 shows a configuration in which the flexible display screen is in a expanded configuration, and FIG. 3 shows a configuration in which the flexible display screen is in a retracted configuration.

Figure 4:
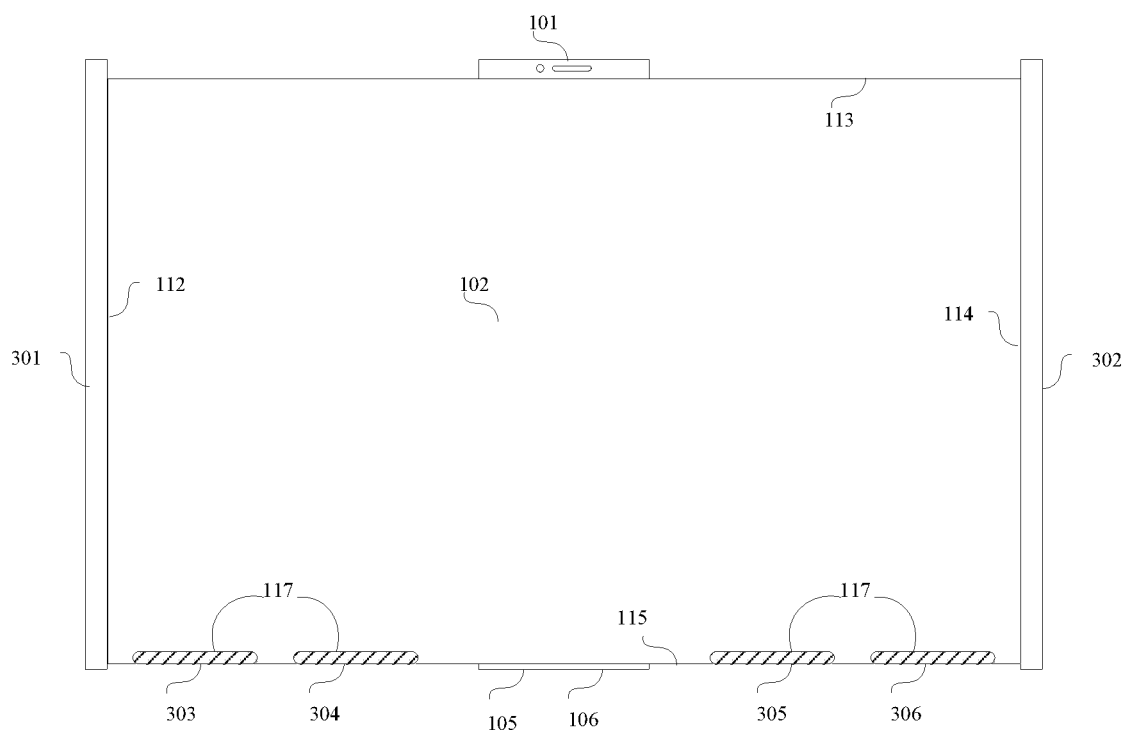
FIG. 4 is a schematic structural view of a mobile terminal according to another exemplary embodiment of the present disclosure.

FIG. 4 is a structural view of a mobile terminal according to another exemplary embodiment of the present disclosure. The differences of this embodiment compared to the exemplary embodiment shown in FIG. 2 are: a central portion of the second rectangular edge 113 and a central portion of the fourth rectangular edge 115 of the flexible display screen 102 are secured to the body 101, respectively. The first rectangular edge 112 and the third rectangular edge 114 may be movable face to face or back to back.

A millimeter-wave antenna module 117 is provided on at least one of the first rectangular edge 112, the second rectangular edge 113, the third rectangular edge 114, and the fourth rectangular edge 115 of the flexible display screen 102.

In one example, four millimeter-wave antenna modules 117 are provided, including a first millimeter-wave antenna module 303, a second millimeter-wave antenna module 304, a third millimeter-wave antenna module 305, and a fourth millimeter-wave antenna module 306.

Correspondingly, the number of the flexible display screen receiving components is two, i.e., a first flexible display screen receiving component 301 and a second flexible display screen receiving component 302. The first rectangular edge 112 of the flexible display screen 102 is secured to the first flexible display screen receiving component 301 and the third rectangular edge 114 of the flexible display screen 102 is secured to the second flexible display screen receiving component 302. The flexible display screen 102 may be expanded or retracted in the direction of the first rectangular edge 112 and the third rectangular edge 114 (i.e., in left-right as shown in the figure) simultaneously or separately.

In the embodiment of the present disclosure, the manner of receiving the flexible display screen is not limited. In one exemplary example, the flexible display screen is retracted and expanded in at least two manners: a rolling receiving manner and a folding receiving manner. Two receiving manners are respectively described below with reference to the mobile terminal provided by the exemplary embodiment shown in FIG. 2 as an example.

For the rolling receiving manner, a reel 401 is provided within the flexible display screen receiving component 111

Figure 5:
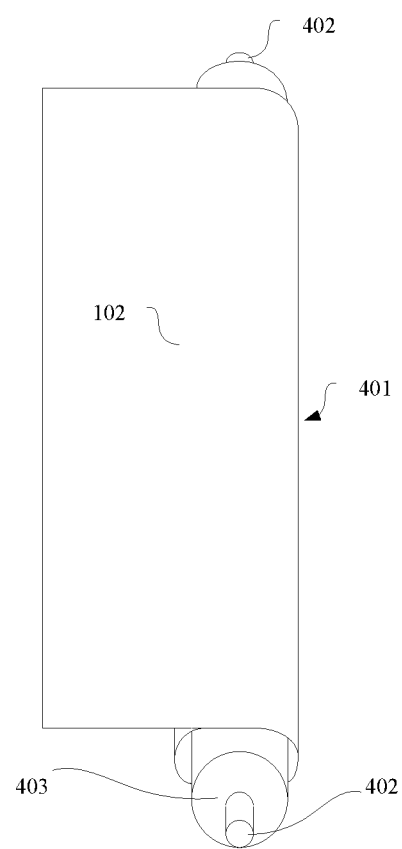
FIG. 5 is a schematic view of a flexible display screen using a rolling receiving structure according to another exemplary embodiment of the present disclosure.

(and/or the body 101), and its structure is shown in FIG. 5. Illustratively, the reel 401 is composed of a fixing shaft 402 secured to upper and lower sides of the flexible display screen receiving component 111 and an outer rotating shaft 403 rotatable around the fixing shaft 402. The third rectangular edge 114 of the flexible display screen 102 is fixed on the outer rotating shaft 403, and the outer rotating shaft 403 rotates to drive the flexible display screen 102 to roll and cover the surface of the outer rotating shaft 403. The flexible display screen receiving component 111 may be pushed inwards or pulled outwards by the user. When the flexible display screen 102 is pushed inwards, the outer rotating shaft 303 is controlled to rotate backwards, so that the flexible display screen 102 is in a retracted configuration; and when the flexible display screen 102 is pulled outwards, the outer rotating shaft 403 is controlled to rotate forwards to expand the flexible display screen 102.

Figure 6:
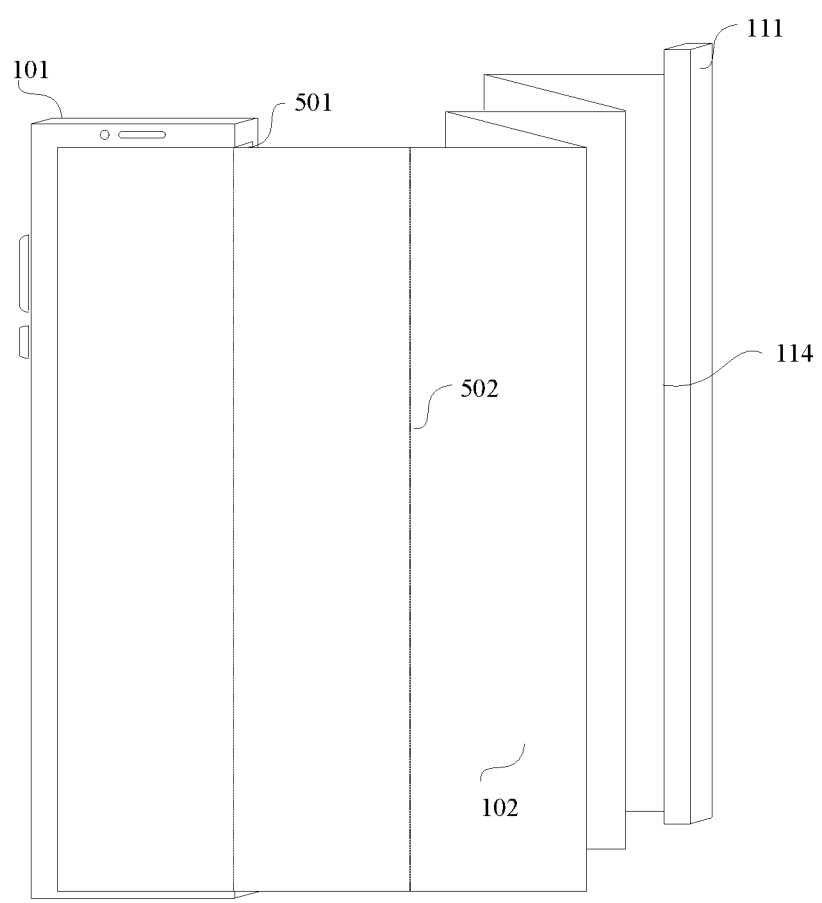
FIG. 6 is a schematic view of a flexible display screen using a folding receiving structure according to another exemplary embodiment of the present disclosure.

For the folding receiving manner, as shown in FIG. 6, the third rectangular edge 114 of the flexible display screen 102 is fixed on the flexible display screen receiving component 111, a flexible display screen receiving groove 501 is provided at a side edge of the body 101, the flexible display screen 102 is equally divided into a plurality of regions by a folding line 502, and after the flexible display screen 102 is sequentially folded along the folding line 502, the flexible display screen 102 may be placed into the flexible display screen receiving groove 501, so that the flexible display screen 102 is retracted. The flexible display screen receiving component 111 is pulled to take the flexible display screen 102 out of the flexible display screen receiving groove 501, so that the flexible display screen 102 is expanded.

In the above embodiments, generally, the control module located inside the body 101 is further included, and the control module may be a CPU or a microprocessor. The control module is electrically connected with the millimeter-wave antenna module 117.

Based on the above embodiments, controlling of millimeter-wave antenna modules 117 can be implemented in at least one of the following three forms:
 a first form: a software control mode;
 a second form: a control mode of combining software and hardware; and
 a third form: a control mode of a hardware switch.

These three modes will be illustrated in the three different embodiments below.

Figure 7:
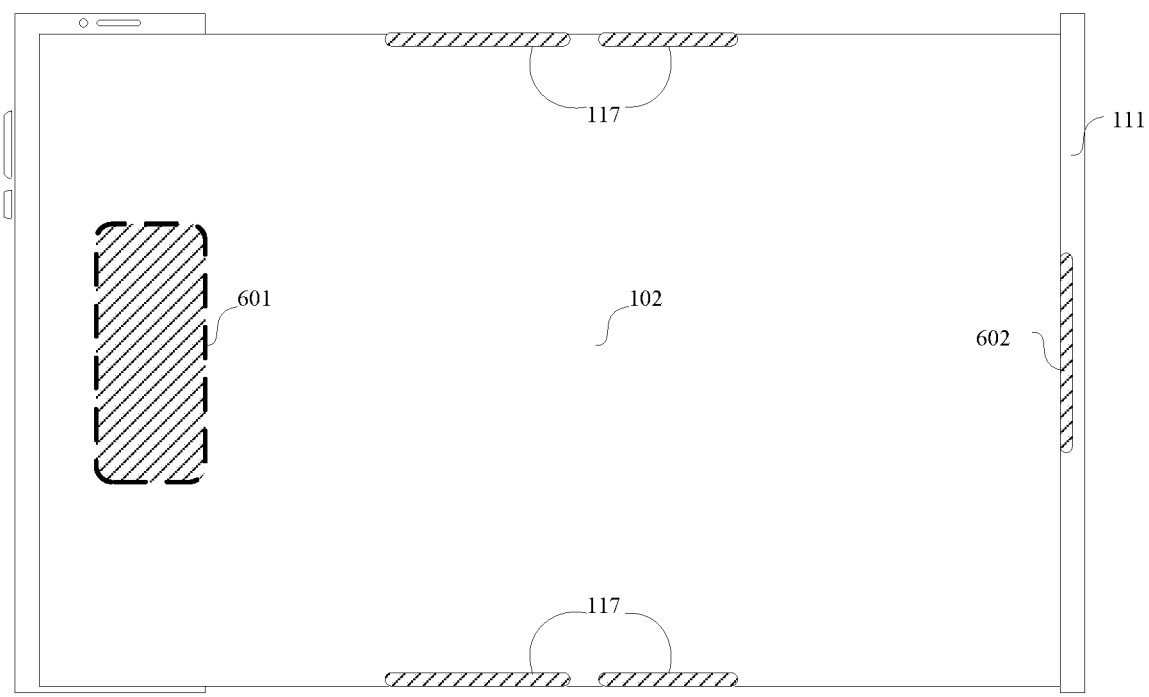
FIG. 7 is a schematic structural view of a mobile terminal according to another exemplary embodiment of the present disclosure.

FIG. 7 is a structural view of a mobile terminal according to another exemplary embodiment of the present disclosure. Based on the exemplary embodiment shown in FIG. 2, a control module 601 is added into the body 101 and a driving module 602 is added to the flexible display screen receiving component 111. The control module 601 is connected to the driving module 602 and the millimeter-wave antenna module 117, respectively. The driving module 602 is an electromechanical component in the form of electric driving.

In one example, the control module 601 includes at least one of three functions: 1. identifying a category of the foreground application; 2. controlling operation and stop of the driving module 602; 3. controlling the millimeter-wave antenna module 117 to be in the non-working state when the flexible display screen 102 is in the retracted configuration, and controlling the millimeter-wave antenna module 117 to be in the working state when the flexible display screen 102 is in the expanded configuration.

The driving module 602 may drive the flexible display receiving component 111 to rotate forwards to expand the flexible display screen 102 or rotate backwards to receive the flexible display screen 102.

In one example, when the control module 601 identifies the category of the foreground application as a game, a video, a reading or other preset program category, the control module 601 sends a first instruction to the driving module 602, and the first instruction is used for controlling the driving module 602 to drive the flexible display screen receiving component 111 to rotate forwards to expand the flexible display screen 102, so that the flexible display screen 102 is in the expanded configuration. The control module 601 sends a second instruction to the millimeter-wave antenna module 117, and the second instruction is used for controlling the millimeter-wave antenna module 117 to be in the working state.

In one example, when the control module 601 identifies the category of the foreground application as a game, a video, a reading or other preset program category, the control module 601 sends a third instruction to the driving module 602, and the third instruction is used for controlling the driving module 602 to drive the flexible display screen receiving component 111 to rotate backwards to receive the flexible display screen 102, so that the flexible display screen 102 is in the retracted configuration. The control module 601 sends a fourth instruction to the millimeter-wave antenna module 117, and the fourth instruction is used for controlling millimeter-wave antenna module 117 to be in the non-working state.

As above described, the mobile terminal provided by this embodiment can intelligently control the state of the flexible display screen 102 and simultaneously control the working state of the millimeter-wave antenna module 117 by identifying the foreground application. When a specific foreground application program is used, the mobile terminal can automatically expand or receive the flexible display screen 102, so as to provide good use experience for a user, and meanwhile, the working state of the millimeter-wave antenna module 117 are automatically switched, so that the antenna performance can be improved, and thus the mobile terminal can be more convenient to be used.

Figure 8:
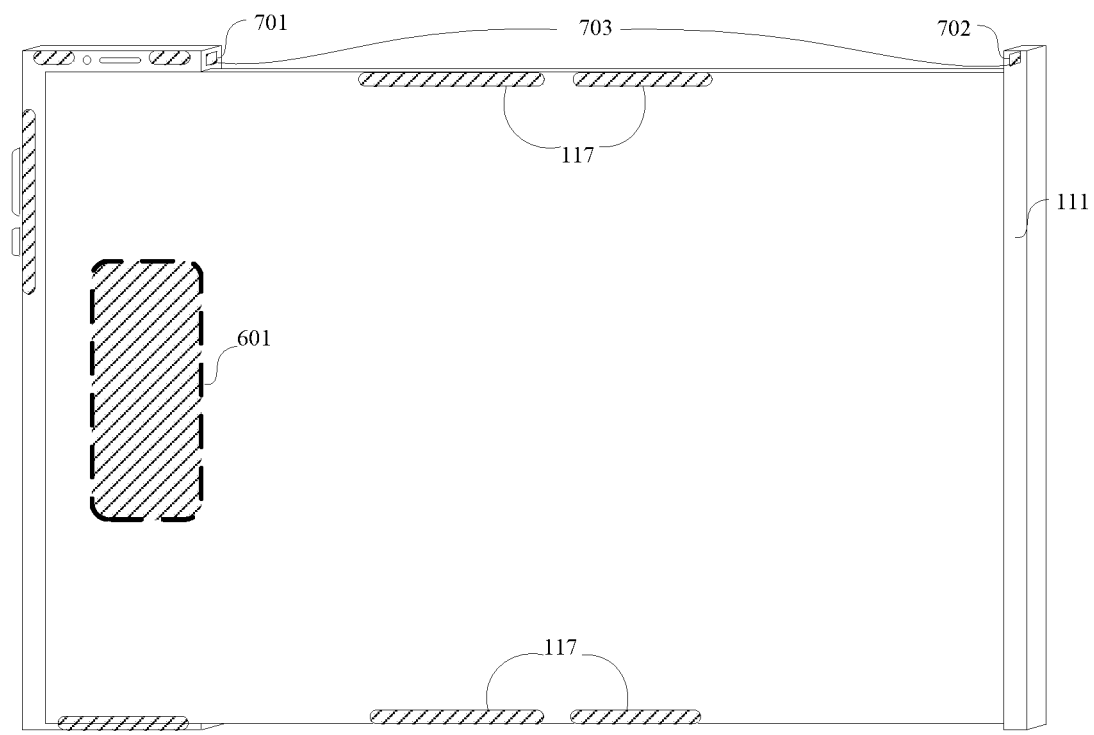
FIG. 8 is a schematic view of a mobile terminal when the flexible display screen is in the expanded configuration according to another exemplary embodiment of the present disclosure.

FIG. 8 is a structural view of a mobile terminal according to another exemplary embodiment of the present disclosure. A control module 601 and a state detection component 703 are added to the exemplary embodiment shown in FIG. 2. The state detection component 703 includes a Hall sensor 701 and a magnet 702.

Illustratively, the control module 601 and the Hall sensor 701 are disposed within the body 101, and a magnet 702 is added to the flexible display screen receiving component 111. The control module 601 is connected to the Hall sensor 701 and the millimeter-wave antenna module 117, respectively.

The control module 601 has two functions of: 1. identifying a signal output by the Hall sensor 701; 2. controlling the millimeter-wave antenna module 117 to be in the non-working state when the flexible display screen 102 is in the retracted configuration; and controlling the millimeter-wave antenna module 117 to be in the working state when the flexible display screen 102 is in the expanded configuration.

Figure 9:
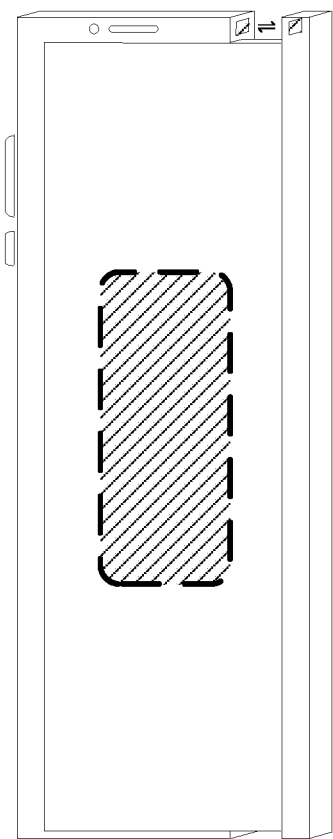
FIG. 9 is a schematic view of a mobile terminal when the flexible display screen is in the retracted configuration according to another exemplary embodiment of the present disclosure.

The state detection component 703 may detect a state of the flexible display screen 102. Specifically, when the flexible display screen 102 is in the retracted configuration as shown in FIG. 9, the magnet 702 is close to the Hall sensor 701, the magnetic field around the Hall sensor 701 is increased, and at this time, the Hall sensor 701 outputs a first signal; when the flexible display screen 102 is in the expanded configuration as shown in FIG. 8, the magnet 702 is far away from the Hall sensor 701, the magnetic field around the Hall sensor 701 is weakened, and at this time, the Hall sensor 701 outputs a second signal.

When the control module 601 identifies the first signal output by the Hall sensor 701, the flexible display screen 102 is in the retracted configuration, the control module 601 sends a fourth instruction to the millimeter-wave antenna module 117, and controls the millimeter-wave antenna module 117 to be in the non-working state.

When the control module 601 identifies that the Hall sensor 701 outputs the second signal, the flexible display screen 102 is in the expanded configuration, the control module 601 sends a second instruction to the millimeter-wave antenna module 117, and controls the millimeter-wave antenna module 117 to be in the working state.

As above described, the mobile terminal provided by this embodiment can automatically control the working state of the millimeter-wave antenna module 117 by identifying the state of the flexible display screen. When the flexible display screen is expanded or retracted, the millimeter-wave antenna module 117 is automatically switched into a more suitable working state to improve the antenna performances of the mobile terminal, so that the user can have good use experience.

Figure 10:
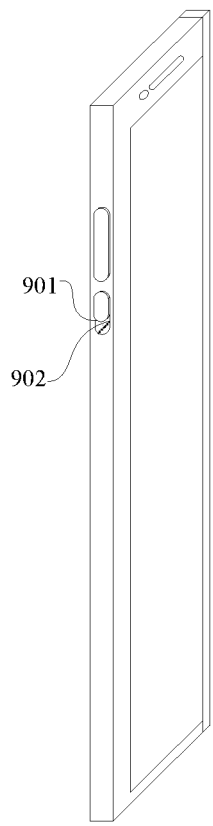
FIG. 10 is a schematic structural view of a mobile terminal when an antenna switch is in a first state according to another exemplary embodiment of the present disclosure.

FIG. 10 is a structural view of a mobile terminal according to another exemplary embodiment of the present disclosure. Based on the exemplary embodiment shown in FIG. 2, an antenna switch 901 is added to the body. The antenna switch 901 is connected with the millimeter-wave antenna module 117.

The antenna switch 901 may control switching of two working states of the millimeter-wave antenna module 117.

As shown in FIG. 10, when the antenna switch 901 is in a first state 902, the millimeter-wave antenna module 117 is controlled to be in the non-working state.

Figure 11:
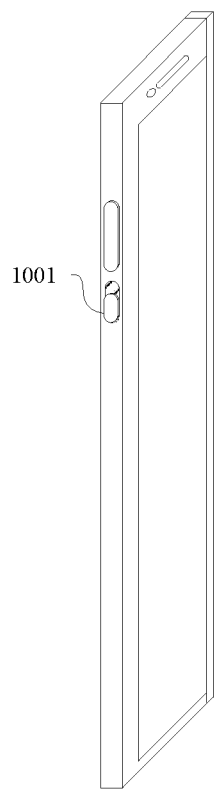
FIG. 11 is a schematic structural view of a mobile terminal when the antenna switch is in a second state according to another exemplary embodiment of the present disclosure.

As shown in FIG. 11, when the antenna switch 901 is in a second state 1001, the millimeter-wave antenna module 117 is controlled to be in the working state.

As above described, the mobile terminal provided by this embodiment can change the working state of the millimeter-wave antenna module 117 by manually changing the state of the antenna switch 901. When the mobile terminal operates in complex usage environments, the user can autonomously control the working state of the millimeter-wave antenna module 117 by using the antenna switch, so that the mobile terminal can adapt to the complex usage environments, the antenna performance of the mobile terminal can be improved, and the use experience of the user can be improved.

Three modes by which the mobile terminal individually controls the millimeter-wave antenna module 117 are mentioned above. Illustratively, the body 101 of the mobile terminal may be further provided with a primary antenna. The mobile terminal can simultaneously control the primary antenna and the millimeter-wave antenna module 117 to work cooperatively or separately. Hereinafter, a mobile terminal provided with a primary antenna will be described, and then two modes of simultaneously controlling the primary antenna and the millimeter-wave antenna module 117 will be respectively described in two embodiments.

Figure 12:
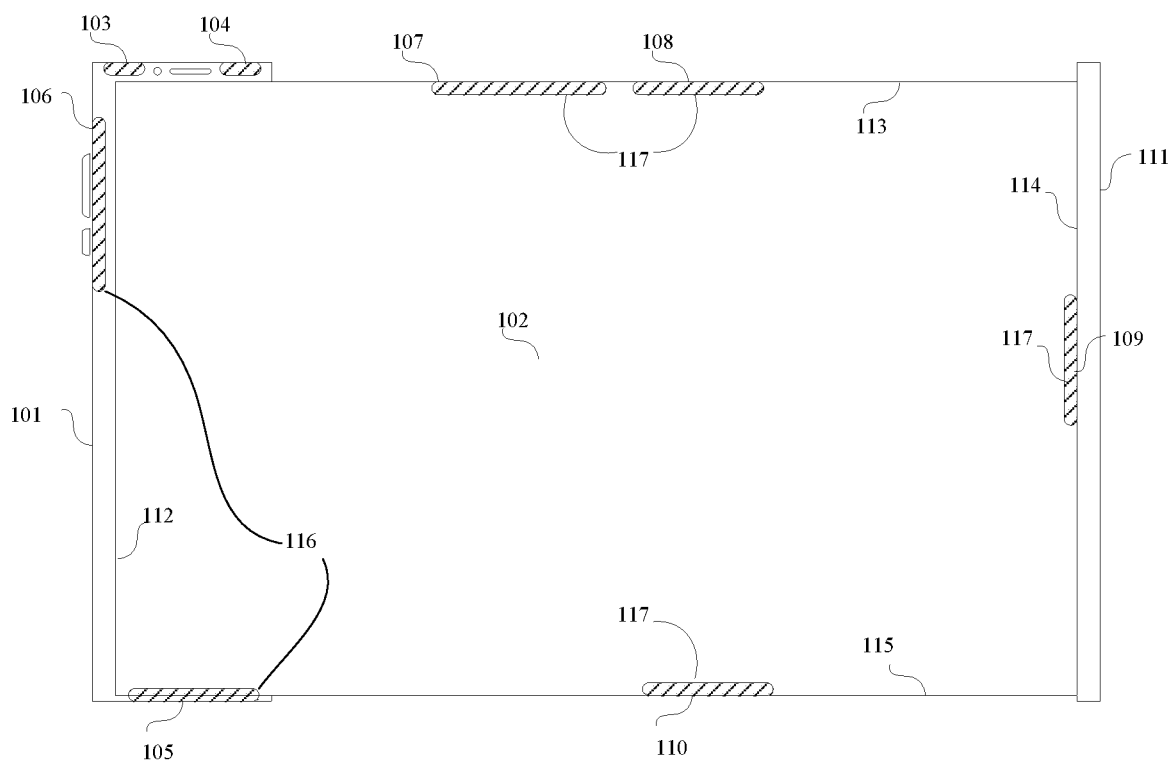
FIG. 12 is a schematic structural view of a mobile terminal when the flexible display screen is in the expanded configuration according to another exemplary embodiment of the present disclosure.

FIG. 12 is a structural view of a mobile terminal according to another exemplary embodiment of the present disclosure. On the basis of the exemplary embodiment shown in FIG. 2, a primary antenna 116 is added into the body 101, and the primary antenna 116 includes a main antenna 105 or, the main antenna 105 and a diversity antenna 106. The primary antenna 116 including both the main antenna 105 and the diversity antenna 106 is exemplified in FIG. 12.

Illustratively, at least one of a GPS receiving antenna 103 and a WIFI antenna 104 may be further disposed within the body 101. In the above embodiment, a control module located inside the body is also included, and the control module may be a CPU or a microprocessor. The control module is electrically connected with the respective antennas.

Based on the above embodiments, switching of working states between the primary antenna 116 and the millimeter-wave antenna module 117 may be implemented in at least one of the following two forms:

a first form: a software control mode; and a second form: a control mode of combining software and hardware.

These two modes are illustrated in the two different embodiments.

Figure 13:
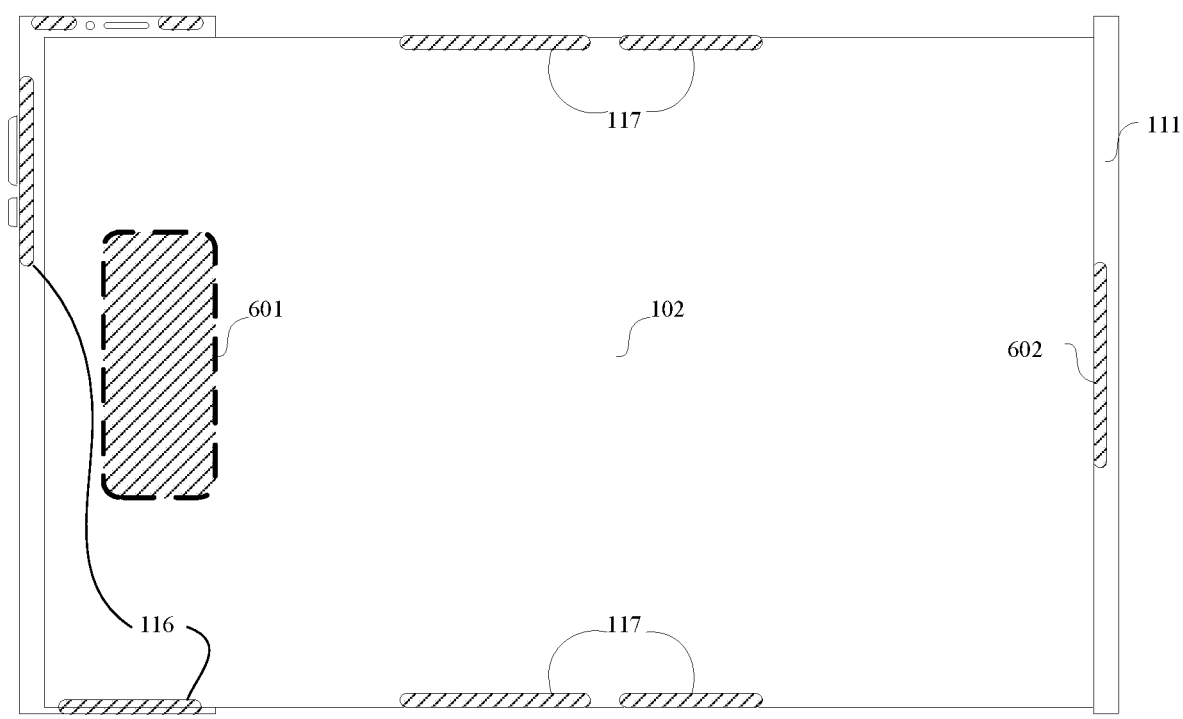
FIG. 13 is a schematic structural view of a mobile terminal according to another exemplary embodiment of the present disclosure.

FIG. 13 is a structural view of a mobile terminal according to another exemplary embodiment of the present disclosure. Based on the exemplary embodiment shown in FIG. 12, a control module 601 is added into the body 101 and a driving module 602 is added to the flexible display screen storage assembly 111. The control module 601 is connected to the driving module 602, the primary antenna 116, and the millimeter-wave antenna module 117, respectively. The driving module 602 is an electromechanical component in the form of electric driving.

In one example, the control module 601 includes at least one of three functions: 1. identifying a category of the foreground application; 2. controlling operation and stop of the driving module 602; 3. controlling the primary antenna 116 to be in the working state and the millimeter-wave antenna module 117 to be in the non-working state when the flexible display screen 102 is in the retracted configuration; and controlling the primary antenna 116 to be in the non-working state and controlling the millimeter-wave antenna module 117 to be in the working state when the flexible display screen 102 is in the expanded configuration.

The driving module 602 may drive the flexible display receiving component 111 to rotate forwards to expand the flexible display screen 102 or rotate backwards to receive the flexible display screen 102.

In one example, when the control module 601 identifies that the category of the foreground application as a game, a video, a reading or other preset program category, the control module 601 sends a first instruction to the driving module 602, and the first instruction is used for controlling the driving module 602 to drive the flexible display screen receiving component 111 to rotate forwards to expand the flexible display screen 102, so that the flexible display screen 102 is in the expanded configuration. The control module 601 sends a fifth instruction to the primary antenna 116 and the millimeter-wave antenna module 117, and the fifth instruction is used to control the primary antenna 116 and the millimeter-wave antenna module 117 to switch their working states such that the primary antenna 116 is in the non-working state and the millimeter-wave antenna module 117 is in the working state.

In one example, when the control module 601 identifies that the category of the foreground application as a game, a video, a reading or other preset program category, the control module 601 sends a third instruction to the driving module 602, and the third instruction is used for controlling the driving module 602 to drive the flexible display screen receiving component 111 to rotate backwards to receive the flexible display screen 102, so that the flexible display screen 102 is in the retracted configuration. The control module 601 sends a sixth instruction to the primary antenna 116 and the millimeter-wave antenna module 117, and the sixth instruction is used to control the primary antenna 116 and the millimeter-wave antenna module 117 to switch their working states such that the primary antenna 116 is in the working state and the millimeter-wave antenna module 117 is in the non-working state.

As above described, the mobile terminal provided in this embodiment can intelligently control the state of the flexible display screen 102 and simultaneously control the working states of the primary antenna 116 and the millimeter-wave antenna module 117 by identifying the foreground application. When a specific foreground application program is used, the mobile terminal can automatically expand or receive the flexible display screen 102, so as to provide good use experience for a user; and meanwhile, the working states of the primary antenna 116 and the millimeter-wave antenna module 117 are automatically switched, so that the antenna is automatically switched to enable the millimeter-wave antenna module 117 to work when the mobile terminal is permitted to use some preset programs, to improve the antenna performance of the mobile terminal and the user's experience.

Figure 14:
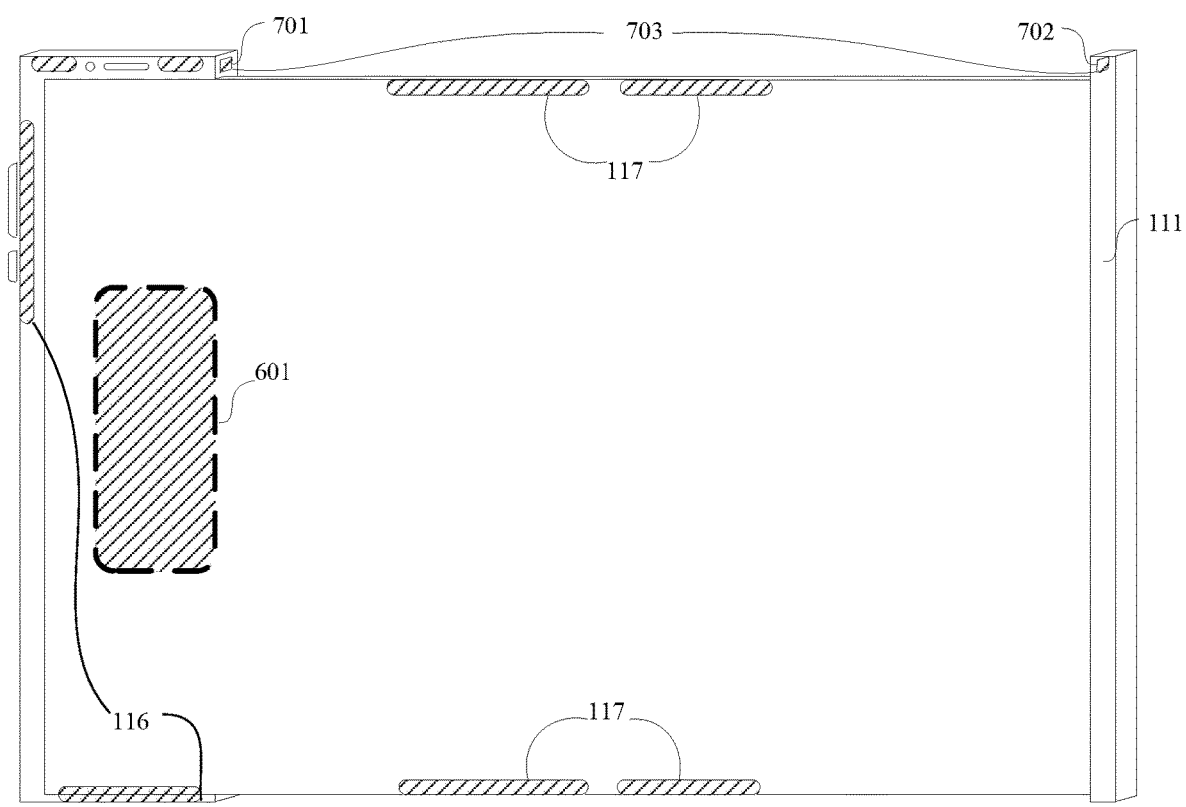
FIG. 14 is a schematic view of a mobile terminal when the flexible display screen is in the expanded configuration according to another exemplary embodiment of the present disclosure.

FIG. 14 is a structural view of a mobile terminal according to another exemplary embodiment of the present disclosure. A control module 601 and a state detection component 703 are added to the exemplary embodiment shown in FIG. 12. The state detection component 703 includes a Hall sensor 701 and a magnet 702.

Illustratively, the control module 601 and the Hall sensor 701 are disposed within the body 101, and a magnet 702 is added to the flexible display screen receiving component 111. The control module 601 is connected to the Hall sensor 701, the primary antenna 116, and the millimeter-wave antenna module 117, respectively.

The control module 601 has two functions: 1. identifying a signal output by the Hall sensor 701; 2. when the flexible display screen 102 is in the retracted configuration, controlling the primary antenna 116 to be in the working state and controlling the millimeter-wave antenna module 117 to be in the non-working state; and when the flexible display screen 102 is in the expanded configuration, controlling the primary antenna 116 to be in the non-working state and controlling the millimeter-wave antenna module 117 to be in the working state.

The state detection component 703 may detect a state of the flexible display screen 102. Specifically, when the flexible display screen 102 is in the retracted configuration as shown in FIG. 9, the magnet 702 is close to the Hall sensor 701, the magnetic field around the Hall sensor 701 is increased, and at this time, the Hall sensor 701 outputs a first signal; when the flexible display screen 102 is in the expanded configuration as shown in FIG. 8, the magnet 702 is far away from the Hall sensor 701, the magnetic field around the Hall sensor 701 is decreased, and at this time, the Hall sensor 701 outputs a second signal.

When the control module 601 identifies the first signal output by the Hall sensor 701, the flexible display screen 102 is in the retracted configuration, the control module 601 sends a sixth instruction to the primary antenna 116 and the millimeter-wave antenna module 117, and controls the primary antenna 116 and the millimeter-wave antenna module 117 to switch their working states such that the primary antenna 116 is in the working state and the millimeter-wave antenna module 117 is in the non-working state.

When the control module 601 identifies that the Hall sensor 701 outputs the second signal, the flexible display screen 102 is in the expanded configuration, the control module 601 sends a fifth instruction to the primary antenna 116 and the millimeter-wave antenna module 117, and controls the primary antenna 116 and the millimeter-wave antenna module 117 to switch their working states such that the primary antenna 116 is in the non-working state and the millimeter-wave antenna module 117 is in the working state.

As above described, the mobile terminal provided by this embodiment can automatically control the working states of the primary antenna 116 and the millimeter-wave antenna module 117 by identifying the state of the flexible display screen. When the flexible display screen is expanded or retracted, the antenna is automatically switched into a more suitable working state, so that the user can have good use experience. The antenna performance of the mobile terminal can be improved.

Figure 15:
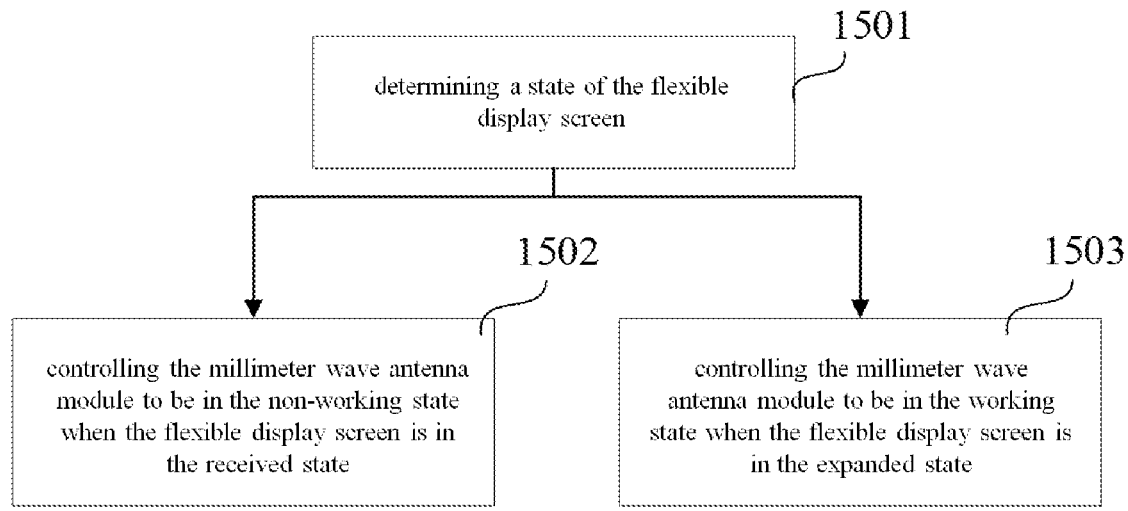
FIG. 15 is a flowchart of an antenna control method according to an exemplary embodiment of the present disclosure.

FIG. 15 is a flowchart of an antenna control method according to an exemplary embodiment of the present disclosure. This embodiment is illustrated as an example that the method is applied to the mobile terminal shown in FIG. 7. The method may include:

step 1501: determining a state of the flexible display screen 102;

if the flexible display screen 102 is in the retracted configuration, step 1502 is performed; and if the state of the flexible display screen 102 is the expanded configuration, step 1503 is performed.

step 1502: controlling the millimeter-wave antenna module 117 to be in the non-working state when the flexible display screen 102 is in the retracted configuration; and step 1503: controlling the millimeter-wave antenna module 117 to be in the working state when the flexible display screen 102 is in the expanded configuration.

As above described, the antenna control method provided by this embodiment provides a method for automatically switching the working state of the millimeter-wave antenna module 117 according to different states of the flexible display screen 102. By using the control method, the antenna may be automatically switched into a more suitable working state when the flexible display screen is expanded or retracted, so that the user can have good use experience. The antenna performance of the mobile terminal can be improved.

In the above embodiment of the control method, various methods for determining the state of the flexible display screen 102 may be provided. Illustratively, the method for determining the state of the flexible display screen 102 may be a method to identify the state of the flexible display screen 102 by identifying software instructions, or may be a method to identify the state of the flexible display screen 102 by setting the hardware.

In one example, the software mode for sensing the state of the flexible display screen 102 may be implemented to identify the state of the flexible display screen 102 by identifying control instructions of the control module 601.

In one example, the hardware mode for sensing the state of the flexible display screen 102 may be implemented to identify the state of the flexible display screen 102 by one or more of a state detection component 703, a sensor, and a mechanical component having sensing functions, which are disposed on the mobile terminal.

The two methods are described in two different embodiments below:

a first method, i.e., a method for controlling an antenna by using the software; and a second method, i.e., a method for controlling an antenna by using a combination of software and hardware.

Figure 16:
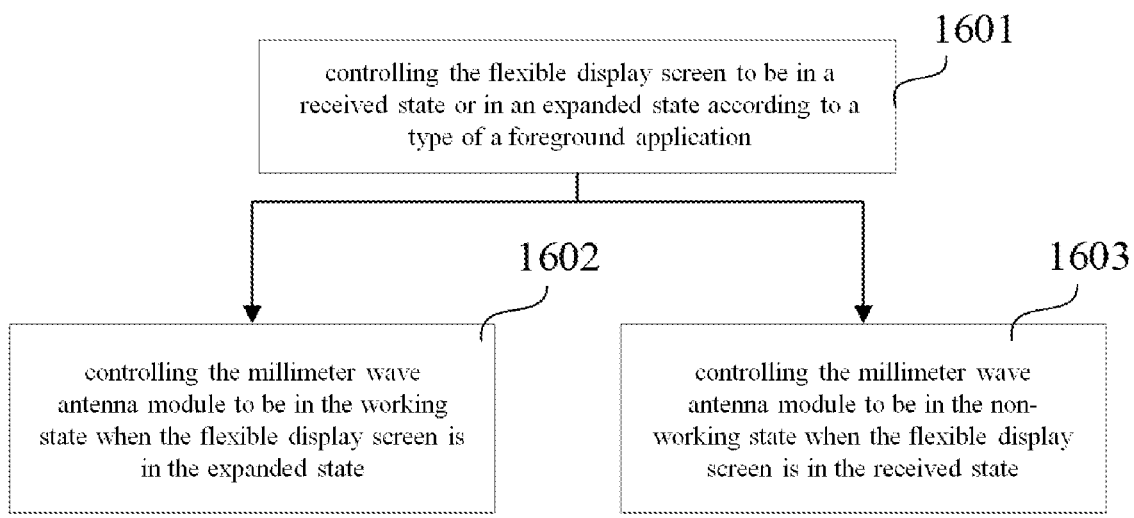
FIG. 16 is a flowchart of an antenna control method according to another exemplary embodiment of the present disclosure.

FIG. 16 is a flowchart of an antenna control method according to an exemplary embodiment of the present disclosure. This embodiment is illustrated as an example that the method is applied to the mobile terminal shown in FIG. 7. The method may include:

step 1601: controlling the flexible display screen 102 to be in a retracted configuration or in an expanded configuration according to a type of a foreground application;

the control module 601 identifies whether the category of the foreground application is a game, a video, a reading, or other preset program category.

If yes, step 1602 is performed; and if not, step 1603 is performed.

Step 1602: controlling the millimeter-wave antenna module 117 to be in the working state when the flexible display screen 102 is in the expanded configuration.

In one example, the control module 601 sends a first instruction to the driving module 602 to expand the flexible display screen 102, and sends a second instruction to the millimeter-wave antenna module 117 to control the millimeter-wave antenna module 117 to be in the working state.

Step 1603: controlling the millimeter-wave antenna module 117 to be in the non-working state when the flexible display screen 102 is in the retracted configuration.

In one example, the control module 601 sends a third instruction to the driving module 602, and the third instruction is used for instructing to receive the flexible display screen 102. In addition, the control module 601 further sends a fourth instruction to the millimeter-wave antenna module 117, and the fourth instruction is used for controlling the millimeter-wave antenna module 117 to be in the non-working state.

As above described, the antenna control method provided by this embodiment is presented as a method for intelligently controlling a state of the flexible display screen 102 and simultaneously controlling a working state of the millimeter-wave antenna module 117 by identifying a foreground application program. In combination with the foreground application program, the antenna is controlled to work. When a special foreground application program is used, the mobile terminal automatically expands or receives the flexible display screen 102, so that good use experience is provided for a user, and meanwhile, the working state of the millimeter-wave antenna module 117 is automatically switched, such that the antenna performance of the mobile terminal is improved.

Figure 17:
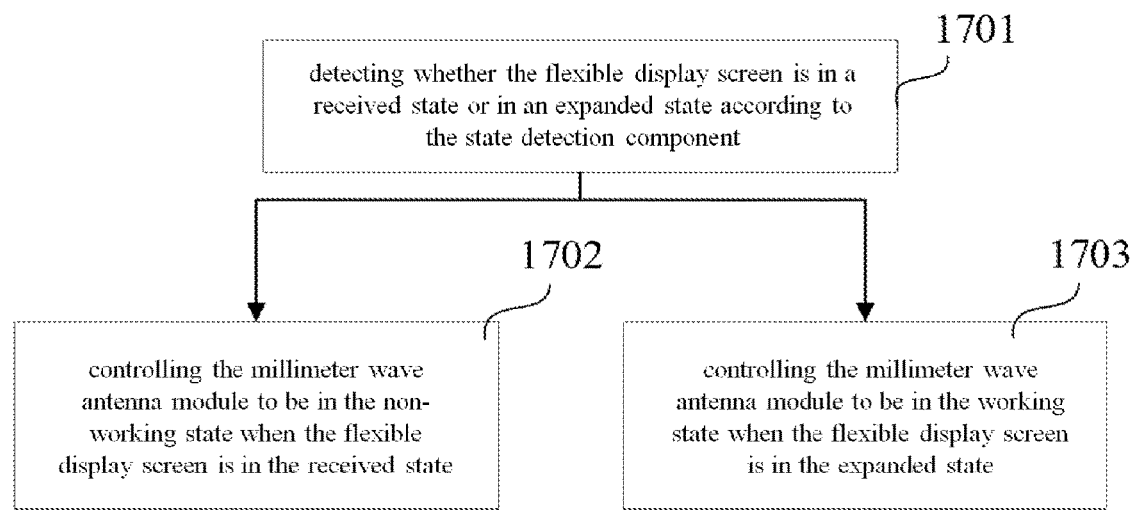
FIG. 17 is a flowchart of an antenna control method according to another exemplary embodiment of the present disclosure.

FIG. 17 is a flowchart of an antenna control method according to an exemplary embodiment of the present disclosure. This embodiment is illustrated as an example that the method is applied to the mobile terminal shown in FIG. 8. The method may include:

step 1701: detecting whether the flexible display screen 102 is in a retracted configuration or in an expanded configuration according to the state detection component 703;

in one example, the control module 601 identifies a state of the flexible display screen 102 detected by the state detection component 703.

If the flexible display screen 102 is in the retracted configuration, step 1702 is performed; and if the flexible display screen 102 is in the expanded configuration, step 1703 is performed.

Step 1702: controlling the millimeter-wave antenna module 117 to be in the non-working state when the flexible display screen 102 is in the retracted configuration;

in one example, the control module 601 sends a fourth instruction to the millimeter-wave antenna module 117 to control the millimeter-wave antenna module 117 to be in a non-working state.

Step 1703: controlling the millimeter-wave antenna module 117 to be in the working state when the flexible display screen 102 is in the expanded configuration.

In one example, the control module 601 sends a second instruction to the millimeter-wave antenna module 117 to control the millimeter-wave antenna module 117 to be in the working state.

As above described, the antenna control method provided by this embodiment is presented as a method for controlling the working state of the millimeter-wave antenna module 117 by identifying whether the flexible display screen 102 is in the retracted or in expanded configuration through the state detection component 703. The state detection component 703 is employed to detect the state of the flexible display screen 102, to transmit the state of the flexible display screen 102 to the control module 601 in real time, so that the sensitivity of the mobile terminal to the state of the flexible display screen 102 can be improved, the accuracy of controlling the millimeter-wave antenna module 117 can be further improved, and the antenna performance of the mobile terminal can be improved.

According to the embodiments of the antenna control method, when the state of the flexible display screen 102 is changed, the working state of the millimeter-wave antenna module 117 can be automatically adjusted, so that the millimeter-wave antenna module 117 works in a proper working environment, and the antenna performance of the mobile terminal can be improved. Hereinafter, one embodiment is employed to illustrate the method of manual control.

Figure 18:
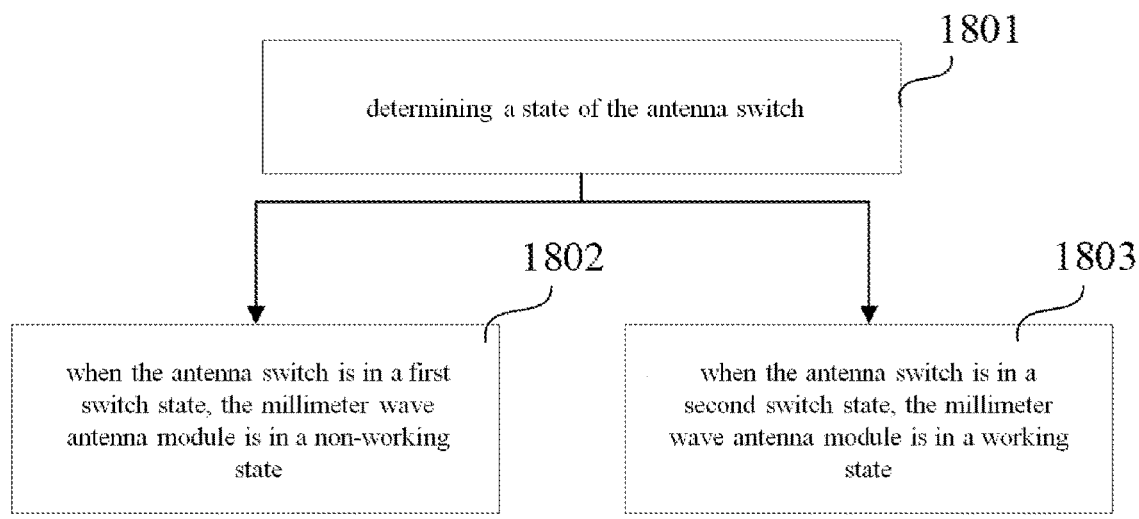
FIG. 18 is a flowchart of an antenna control method according to another exemplary embodiment of the present disclosure.

FIG. 18 is a flowchart of an antenna control method according to an exemplary embodiment of the present disclosure. This embodiment is illustrated as an example that the method is applied to the mobile terminal shown in FIG. 10. The method may include:

step 1801: determining a state of the antenna switch 901.

When the antenna switch 901 is in a first state 902, step 1802 is performed; and when the antenna switch 901 is in a second state 1001, step 1803 is performed.

In step 1802, when the antenna switch 901 is in a first switch state, the millimeter-wave antenna module 117 is in a non-working state.

In step 1803, when the antenna switch 901 is in a second switch state, the millimeter-wave antenna module 117 is in a working state.

As above described, the antenna control method provided by this embodiment provides a method for switching the working state of the millimeter-wave antenna module 117 by controlling the antenna switch 901. When the mobile terminal works in a complex use environment, a user can use the antenna switch to autonomously control the working state of the millimeter-wave antenna module 117, so that the mobile terminal can adapt to the complex use environment, the antenna performance of the mobile terminal can be improved, and the use experience of the user can be improved.

Based on the mobile terminals of the above embodiments, the present disclosure further provides a control method for switching the working states of the primary antenna 116 and the millimeter-wave antenna module 117, wherein the antenna control method includes at least three methods. Hereinafter, three embodiments are employed to illustrate the following three working methods:

a first method, i.e., a general antenna control method;

a second method, i.e., a software antenna control method of; and a third method, i.e., a control method combining software and hardware.

Figure 19:
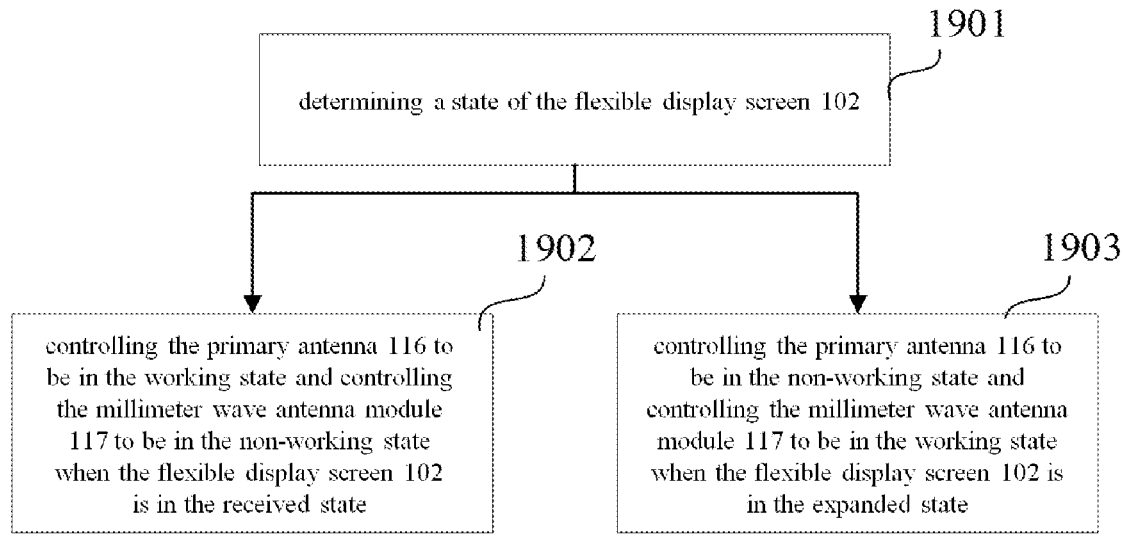
FIG. 19 is a flowchart of an antenna control method according to another exemplary embodiment of the present disclosure.

FIG. 19 is a flowchart of an antenna control method according to an exemplary embodiment of the present disclosure. This embodiment is illustrated as an example that the method is applied to the mobile terminal shown in FIG. 13. The method may include:

step 1901: determining a state of the flexible display screen 102;

if the flexible display screen 102 is in the retracted configuration, step 1902 is performed; and if the state of the flexible display screen 102 is the expanded configuration, step 1903 is performed.

Step 1902: controlling the primary antenna 116 to be in the working state and controlling the millimeter-wave antenna module 117 to be in the non-working state when the flexible display screen 102 is in the retracted configuration;

step 1903: controlling the primary antenna 116 to be in the non-working state and controlling the millimeter-wave antenna module 117 to be in the working state when the flexible display screen 102 is in the expanded configuration.

As above described, this embodiment provides an antenna control method for automatically switching the working states of the primary antenna 116 and the millimeter-wave antenna module 117 according to different states of the flexible display screen 102. By using the control method, the antenna can be automatically switched into a more suitable working state when the flexible display screen is expanded or retracted, so that the user can have good use experience, and also, the antenna performance of the mobile terminal can be improved.

In the above embodiments of the antenna control method, there may be various methods for determining the state of the flexible display screen 102, and illustratively, the method for determining the state of the flexible display screen 102 may be a method for identifying the state of the flexible display screen 102 by identifying software instructions, or by providing hardware.

In one example, the software mode for sensing the state of the flexible display screen 102 may be a mode to identify the state of the flexible display screen 102 by identifying control instructions of the control module 601.

In one example, the hardware mode for sensing the state of the flexible display screen 102 may be a mode to identify the state of the flexible display screen 102 by one or more of a state detection component 703, a sensor, and a mechanical component with sensing function, which are disposed on the mobile terminal.

Hereinafter, two embodiments are employed to illustrate the following two working methods:

a first working method, i.e., a method for controlling an antenna by using a software; and a second working method, i.e., a method for controlling an antenna using a combination of software and hardware.

Figure 20:
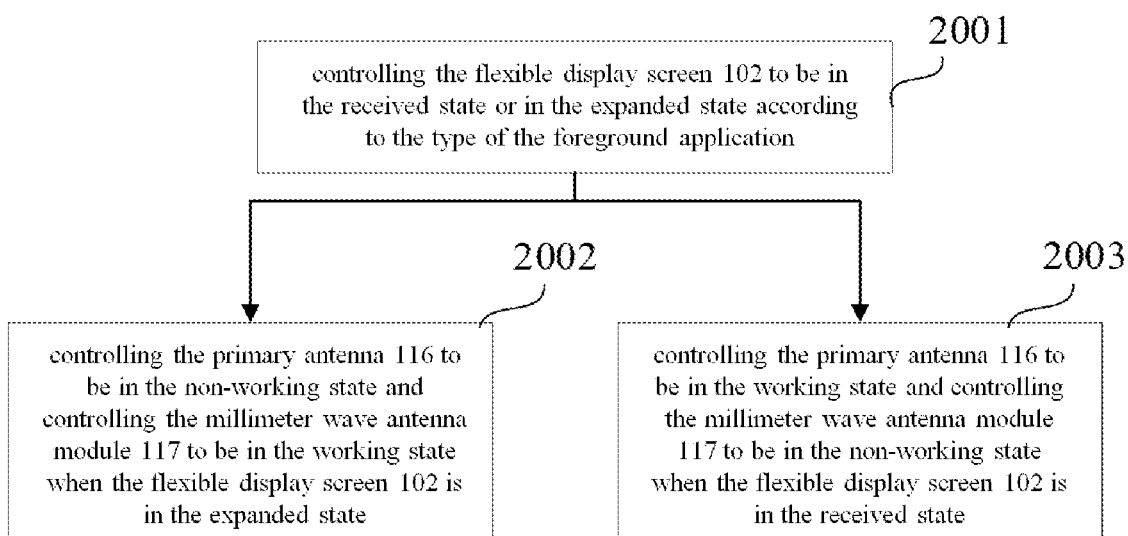
FIG. 20 is a flowchart of an antenna control method according to another exemplary embodiment of the present disclosure.

FIG. 20 is a flowchart of an antenna control method according to an exemplary embodiment of the present disclosure, which is illustrated as an example that the method is applied to the mobile terminal shown in FIG. 13. The method may include:

step 2001: controlling the flexible display screen 102 to be in the retracted configuration or in the expanded configuration according to the type of the foreground application;

the control module 601 identifies whether the category of the foreground application is a game, a video, a reading or other preset program category, and if yes, step 2002 is performed; and if no, step 2003 is performed.

step 2002: controlling the primary antenna 116 to be in the non-working state and controlling the millimeter-wave antenna module 117 to be in the working state when the flexible display screen 102 is in the expanded configuration;

in one example, the control module 601 sends a first instruction to the driving module 602 to expand the flexible display screen 102, sends a fifth instruction to the primary antenna 116 and the millimeter-wave antenna module 117, and controls the primary antenna 116 and the millimeter-wave antenna module 117 to switch their working states such that the primary antenna 116 is in the non-working state and the millimeter-wave antenna module 117 is in the working state.

step 2003: controlling the primary antenna 116 to be in the working state and controlling the millimeter-wave antenna module 117 to be in the non-working state when the flexible display screen 102 is in the retracted configuration.

In one example, the control module 601 sends a third instruction to the driving module 602 to receive the flexible display screen 102, sends a sixth instruction to the primary antenna 116 and the millimeter-wave antenna module 117, and controls the primary antenna 116 and the millimeter-wave antenna module 117 to switch their working states such that the primary antenna 116 is in the working state and the millimeter-wave antenna module 117 is in the non-working state.

As above described, the antenna control method provided by this embodiment provides a method for intelligently controlling a state of the flexible display screen 102 and simultaneously controlling working states of the primary antenna 116 and the millimeter-wave antenna module 117 by identifying a foreground application. Combined with the foreground application program to control the operation of the antenna, the mobile terminal automatically expands or receives the flexible display screen 102 when a specific foreground application program is used, so that good use experience is provided for the user, and meanwhile, the working states of the primary antenna 116 and the millimeter-wave antenna module 117 are automatically switched, so that the antenna performance of the mobile terminal can be improved.

Figure 21:
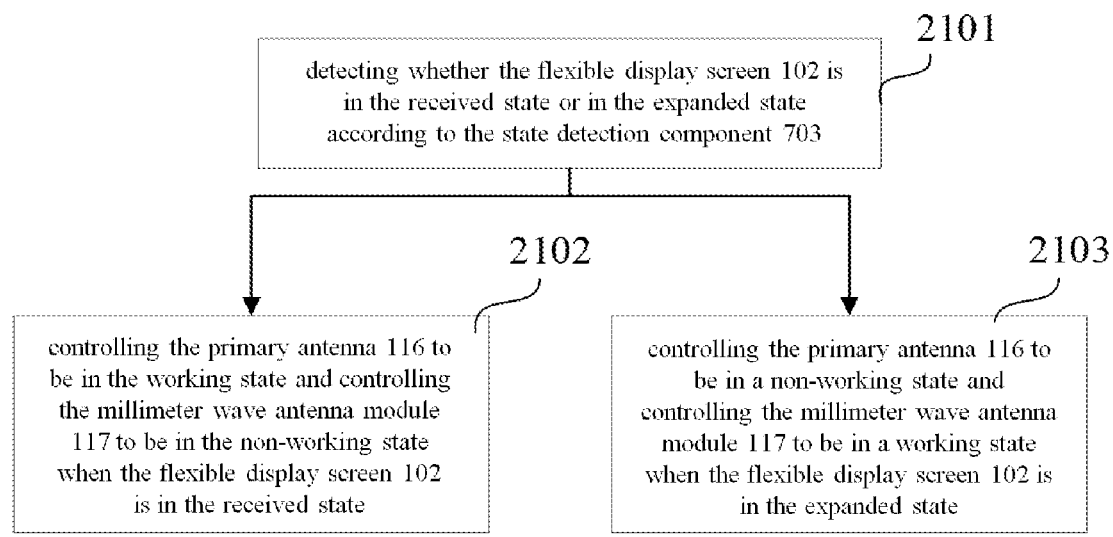
FIG. 21 is a flowchart of an antenna control method according to another exemplary embodiment of the present disclosure.

FIG. 21 is a flowchart of an antenna control method according to an exemplary embodiment of the present disclosure. The present embodiment is illustrated as an example that the method is applied to the mobile terminal shown in FIG. 14, and the method may include:

step 2101: detecting whether the flexible display screen 102 is in the retracted configuration or in the expanded configuration according to the state detection component 703.

In one example, the control module 601 identifies the state of the flexible display screen 102 detected by the state detection component 703. If the flexible display screen 102 is in the retracted configuration, step 2102 is performed; and if the flexible display screen 102 is in the expanded configuration, step 2103 is performed.

Step 2102: controlling the primary antenna 116 to be in the working state and controlling the millimeter-wave antenna module 117 to be in the non-working state when the flexible display screen 102 is in the retracted configuration;

in one example, the control module 601 sends a sixth instruction to the primary antenna 116 and the millimeter-wave antenna module 117, and controls the primary antenna 116 and the millimeter-wave antenna module 117 to switch their working states such that the primary antenna 116 is in the working state and the millimeter-wave antenna module 117 is in the non-working state.

Step 2103: controlling the primary antenna 116 to be in a non-working state and controlling the millimeter-wave antenna module 117 to be in a working state when the flexible display screen 102 is in the expanded configuration.

In one example, the control module 601 sends a fifth instruction to the primary antenna 116 and the millimeter-wave antenna module 117, and controls the primary antenna 116 and the millimeter-wave antenna module 117 to switch their working states such that the non-working state of the primary antenna 116 and the working state of the millimeter-wave antenna module 117.

As above described, this embodiment provides an antenna control method for controlling the working states of the primary antenna 116 and the millimeter-wave antenna module 117 by identifying whether the flexible display screen 102 is in the retracted or in the expanded configuration through the state detection component 703. The state detection component 703 is employed to detect the state of the flexible display screen 102, and the state of the flexible display screen 102 may be transmitted to the control module 601 in real time, so that the sensitivity of the mobile terminal to the state of the flexible display screen 102 can be improved, the accuracy of controlling of the primary antenna 116 and the millimeter-wave antenna module 117 can be further improved, and the antenna performance of the mobile terminal can be improved.

According to the embodiments of the antenna control method, when the state of the flexible display screen 102 is changed, the working states of the primary antenna 116 and the millimeter-wave antenna module 117 can be automatically adjusted, so that the primary antenna 116 and the millimeter-wave antenna module 117 are always working in a proper working environment, and thus improving the antenna performance of the mobile terminal.

Various embodiments of the present disclosure can have one or more of the following advantages.

The millimeter-wave antenna module is placed by using the expandable area of the flexible screen, which can provide a good working environment for the millimeter-wave antenna module, and also not occupy the space of the body, and thus facilitate applying the millimeter-wave antenna to the mobile terminal.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A mobile terminal, comprising:
    a body;
    a flexible display screen disposed at the body, and configured to be switchable between an expanded configuration in which the flexible display screen is expanded to a first area and a retracted configuration in which the flexible display screen is retracted to a second area, and the first area being larger than the second area;
    a millimeter-wave antenna module disposed on at least one flexible edge of the flexible display screen, wherein at least a part of the at least one flexible edge and the millimeter-wave antenna module thereon are received within a receiving space of the body when the flexible display screen is in a retracted configuration.

2. The mobile terminal according to claim 1, wherein the flexible display screen is rectangular, and a first rectangular edge of the flexible display screen is secured to the body; and
    the millimeter-wave antenna module is disposed on at least one of a second rectangular edge, a third rectangular edge and a fourth rectangular edge of the flexible display screen.

3. The mobile terminal according to claim 2, wherein the millimeter-wave antenna module includes at least two sets of millimeter-wave antenna modules arranged discretely.

4. The mobile terminal according to claim 3, wherein each set of millimeter-wave antenna modules includes an antenna array composed of at least two millimeter-wave antennas.

5. The mobile terminal according to claim 4, wherein a control module is further disposed within the body; and the control module is electrically connected with the millimeter-wave antenna module.

6. The mobile terminal according to claim 5, wherein,
    the control module is configured to control the millimeter-wave antenna module to be in a non-working state when the flexible display screen is in the retracted configuration, and control the millimeter-wave antenna module to be in a working state when the flexible display screen is in the expanded configuration.

7. The mobile terminal according to claim 6, wherein,
    the control module is configured to control the flexible display screen to be in the retracted configuration or in the expanded configuration according to a type of a foreground application.

8. The mobile terminal according to claim 6, wherein the body is provided with a state detection component; the control module is connected with the state detection component; and
    the control module is configured to determine whether the flexible display screen is in the retracted configuration or in the expanded configuration according to a signal output by the state detection component.

9. The mobile terminal according to claim 8, wherein the state detection component includes a Hall sensor disposed within the body, and a magnet disposed at a side of the flexible display screen; and
    the Hall sensor is configured to output a first signal to the control module when the flexible display screen is in the retracted configuration, and output a second signal to the control module when the flexible display screen is in the expanded configuration.

10. The mobile terminal according to claim 1, wherein the flexible display screen is rectangular, a central portion of a second rectangular edge of the flexible display screen is secured to the body, and a central portion of a fourth rectangular edge of the flexible display screen is secured to the body; the second rectangular edge and the fourth rectangular edge are two parallel rectangular edges; and
    the millimeter-wave antenna module is disposed on at least one of the first rectangular edge, the second rectangular edge, the third rectangular edge and the fourth rectangular edge of the flexible display screen.

11. The mobile terminal according to claim 1, wherein an antenna switch is further disposed within the body;
    the millimeter-wave antenna module is in the non-working state when the antenna switch is in a first switch state; and
    the millimeter-wave antenna module is in a working state when the antenna switch is in a second switch state.

12. The mobile terminal according to claim 1, wherein a primary antenna is further disposed within the body;
    the primary antenna includes: a main antenna, or the main antenna and a diversity antenna.

13. An antenna control method, wherein the antenna control method is applied to the mobile terminal according to claim 12, and comprises:
    controlling the primary antenna to be in a working state and controlling the millimeter-wave antenna module to be in a non-working state when the flexible display screen is in the retracted configuration; and
    controlling the primary antenna to be in a non-working state and controlling the millimeter-wave antenna module to be in a working state when the flexible display screen is in the expanded configuration.

14. The mobile terminal according to claim 12, wherein a control module is further disposed within the body; and the control module is electrically connected with the primary antenna and the millimeter-wave antenna module, respectively.

15. The mobile terminal according to claim 14, wherein,
    the control module is configured to control the primary antenna to be in the working state and control the millimeter-wave antenna module to be in the non-working state when the flexible display screen is in the retracted configuration; and control the primary antenna to be in the non-working state and the millimeter-wave antenna module to be in the working state when the flexible display screen is in the expanded configuration.

16. The mobile terminal according to claim 14, wherein,
the control module is configured to control the flexible display screen to be in the retracted configuration or in the expanded configuration according to a type of a foreground application.

17. The mobile terminal according to claim 14, wherein a state detection component is disposed on the body; the control module is connected with the state detection component;
the control module is configured to detect whether the flexible display screen is in the retracted configuration or in the expanded configuration according to the state detection component.

18. An antenna control method, wherein the antenna control method is applied to the mobile terminal according to claim 1, and comprises:
controlling the millimeter-wave antenna module to be in a non-working state when the flexible display screen is in the retracted configuration; and
controlling the millimeter-wave antenna module to be in a working state when the flexible display screen is in the expanded configuration.

19. The method according to claim 18, further comprising:
controlling the flexible display screen to be in the retracted configuration or in the expanded configuration according to a type of a foreground application.

20. The method according to claim 18, wherein the body is provided with a state detection component; and the method further comprises:
detecting whether the flexible display screen is in the retracted configuration or in the expanded configuration according to the state detection component.

* * * * *